(12) United States Patent
Bianchini

(10) Patent No.: US 9,381,630 B1
(45) Date of Patent: Jul. 5, 2016

(54) METHOD AND APPARATUS FOR MAKING UP A PLURALITY OF JOINTS OF PIPE

(71) Applicant: Jay G Bianchini, Covington, LA (US)

(72) Inventor: Jay G Bianchini, Covington, LA (US)

( * ) Notice: Subject to any disclaimer, the term of this patent is extended or adjusted under 35 U.S.C. 154(b) by 161 days.

(21) Appl. No.: 14/212,619

(22) Filed: Mar. 14, 2014

(51) Int. Cl.
*B25B 27/02* (2006.01)

(52) U.S. Cl.
CPC ...................................... *B25B 27/02* (2013.01)

(58) Field of Classification Search
USPC ............................................... 254/29 R, 29 A
See application file for complete search history.

(56) References Cited

U.S. PATENT DOCUMENTS

| 4,299,375 A * | 11/1981 | Schosek | F16L 1/06 254/29 R |
| 4,434,969 A * | 3/1984 | Von Ruden | E21B 19/086 254/29 R |
| 2014/0265023 A1* | 9/2014 | Blasczyk | B29C 63/34 264/280 |

* cited by examiner

*Primary Examiner* — Lee D Wilson
*Assistant Examiner* — Shantese McDonald
(74) *Attorney, Agent, or Firm* — Garvey, Smith, Nehrbass & North, LLC; Brett A. North

(57) ABSTRACT

A method and apparatus for pulling multiple joints of pie which comprises a pulling section and a pulled section, the method and apparatus working while the joints of pipe are below grade and capable of pulling multiple joints of pipe without relocating the pulling section.

20 Claims, 16 Drawing Sheets

METHOD AND APPARATUS FOR MAKING UP A PLURALITY OF JOINTS OF PIPE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

Frictionally and/or adhesively bonded joints of pipe are commonly used with many types of underground pipelines. Conventionally available joints of pipe include male and female type jointing.

It is necessary that large forces be used to cause the male end of one joint of pipe to be inserted into the female end of a second joint of pipe so that a proper seal can be made between the two joints of joined piping, along with overcoming frictional forces between the joints of pipe and the ground surface in contact with the joints of pipe.

The large forces necessary to join multiple joints of pipe together are especially difficult to create in confined spaces such as ditches or digouts where the joints of pipe are placed before being joined and which will be filled so that the pipeline will be below or underground.

Conventionally available methods for joining pipes include hammering the one joint into another.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner.

In one embodiment is provided a method and apparatus including a pulling and pulled portions detachably connectable to two pipe joints to be joined which are located in a ditch or dugout, which apparatus pulls one joint relative to the second joint causing socketing of the joints together at a joint area.

In one embodiment is provided cables or chains which detachably connect the pulling and pulled portion of the method and apparatus.

As force is applied by the gas controlled cylinders the joints of pipe are pulled together and one joint is socketed into the other at the joint between them.

In one embodiment each pipe is encircled by a clamping belt.

In one embodiment the gas controlled cylinders include a frictional enhancing material suitable for gripping each joint of pipe, such as rubber.

In one embodiment the pulling section includes a pair of gas controlled cylinders each having extension/retraction rods. In this embodiment each gas controlled cylinder will be detachably connected to a first joint of pipe with diametrically opposed positions on the first joint of pipe.

In various embodiments chains or cables or like pulling members can be connected to the extension/retraction rods of each gas controlled cylinder, and also to a pulled section which pulled section is detachably connected to a second joint of pipe.

In one embodiment the gas controlled cylinders can be actuated causing retraction of the extension/retraction rods into the gas controlled cylinders, said refraction causing the male end of the first joint of pipe to be pulled into the female end of the second joint of pipe.

In various embodiments pulling can be made at time when each joint of pipe is resting in a ditch.

In various embodiments multiple pulls of separate joints of pipe can be made without relocating pulling section when it is detachably connected to the first joint of pipe. In various embodiments at least 2, 3, 4, 5, 6, 7, 8, 9, and 10 separate joints of pipe pulled together without removing the pulling section from its detachable connection to the first joint of pipe. In various embodiments, a range of multiple pulls can be made between any two of the above referenced multiple joints of pipe being pulled without removing the pulling section from its detachable connection to the first joint of pipe.

In various embodiments pulls can be made between a plurality of joints of pipe having a minimum joint length of at least about 10, 12, 14, 15, 16, 18, 20, 22, 25, 30, 35, 40, 45, and/50 feet without removing the pulling section from its detachable connection to the first joint of pipe. In various embodiments, multiple pulls of joints of pipe having lengths falling with a range between any two of the above referenced minimum joint lengths can be made without removing the pulling section from its detachable connection to the first joint of pipe.

In various embodiments the method and apparatus includes a pulling section having a clamping belt with a plurality of pulling cylinders, with at least one of the pulling cylinders being laterally adjustable relative to the clamping belt. In various embodiments both of the pulling cylinders are laterally adjustable relative to the clamping belt. In various embodiments the apparatus includes two clamping belts with wherein at least one of the pulling cylinders has lateral adjustability, and in other embodiments two of the clamping cylinders have lateral adjustability. In various embodiments lateral adjustability can be provided by a loop connection with the at least one clamping belt. In various embodiments lateral adjustability can be provided by a sliding connection, and in other embodiments by a slot connection with the clamping belt.

In various embodiments the method and apparatus includes a pulled section having a clamping belt with a plurality of connectors, with at least one of the connectors being laterally adjustable relative to the clamping belt. In various embodiments both of the clamp connectors are laterally adjustable relative to the clamping belt. In various embodiments the apparatus includes two clamping belts with wherein at least one of the connectors has lateral adjustability, and in other embodiments two of the connectors have lateral adjustability. In various embodiments lateral adjustability can be provided by a loop connection with the at least one clamping belt. In various embodiments lateral adjustability can be provided by a sliding connection, and in other embodiments by a slot connection with the clamping belt.

In various embodiments lateral adjustability can be used to attach to joints of multiple diameters of piping with same system by adjusting length of belt clamp and relative lateral position of connectors to belt.

In various embodiments the pulling and/or pulled sections includes a belt having lateral adjustability to accommodate multiple diameter joints of pipes to be pulled. In various embodiments the pulling and/or clamping units include a belt having lateral adjustability used to attach to joints of multiple diameters of piping with same system by adjusting length of belt for pulling section and relative lateral position of cylinders to belt.

In various embodiments the diameters of pipe which can be accommodated include 6, 8, 12, 14, 16, 18, 20, 22, 24, 26, 28, 30, 32, 34, 36, 42, 48, 60, 72, 84, 96, 108, and/or 120 inch diameters of joints of pipe. In various embodiments, the lateral adjustability is such that it can accommodate a multiple diameters of pipe falling within a range of between any two of the above referenced diameters of joints of pipe.

In various embodiments pulling cylinders are located at 180 degrees from each other around the joint of pipe. In various embodiments pulling cylinders are spaced about 90, 100, 120, 130, 140, 150, 160, 170, 180, 190, 200, 210, 220, 230, 240, 250, 260, 270 degrees from each other. In various embodiments, the pulling cylinders can be spaced within a range of between any two of the above referenced degree spacing.

In various embodiments the method and apparatus includes the steps of, after making a pull, and during the time the pipe string remains resting in a ditch, removing the pulling portion of the apparatus from the joint of pipe to which it was connected before making the pull.

In various embodiments, the pulling section is removed without having to lift resting pipe. In various embodiments, the pulling section is removed without digging out around resting pipe. In various embodiments, the pulling section is removed by sliding at least one clamping belt relative to at least one of the cylinders. In various embodiments, the clamp belt of the pulling section removed from ditch separately from both gas controlled cylinders (clamp detached from at least the separately removed cylinder/clamp detached from both cylinders). In various embodiments, the clamp belt and gas controlled cylinder can be removed from the ditch separately from other gas controlled cylinder (clamp detached from at least the separately removed cylinder/clamp detached from both cylinders)

In various embodiments, the pulled can be removed when pipe resting in ditch, clamping section removed from pipe. In various embodiments, the pulled section is removed without digging out around resting pipe. In various embodiments, the pulled section is removed by sliding at least one clamping belt relative to at least one of the connectors. In various embodiments, the clamp belt of the pulled section removed from ditch separately from both connectors. In various embodiments, the clamp belt and connector can be removed from the ditch separately from other connector for the pulled section (first connector detached from clamping belt separately removed from the clamping belt and/or second connect; and/or both connectors detached from the clamping belt and separately removed).

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
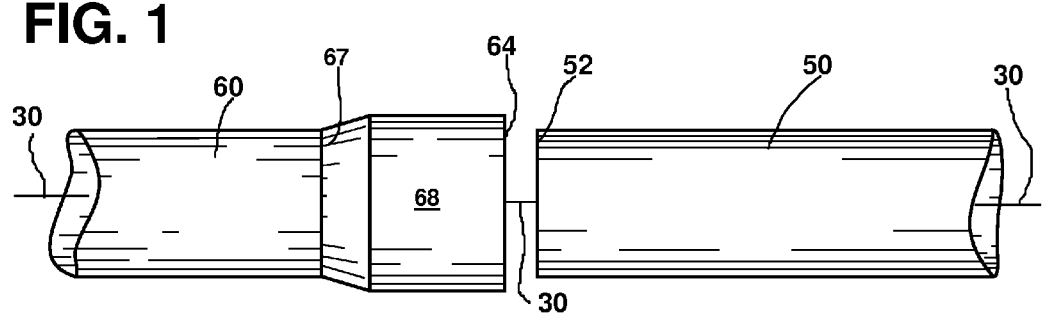
FIG. 1 is a side view of first and second joints of pipe to be attached using the method and apparatus.
Figure 4:
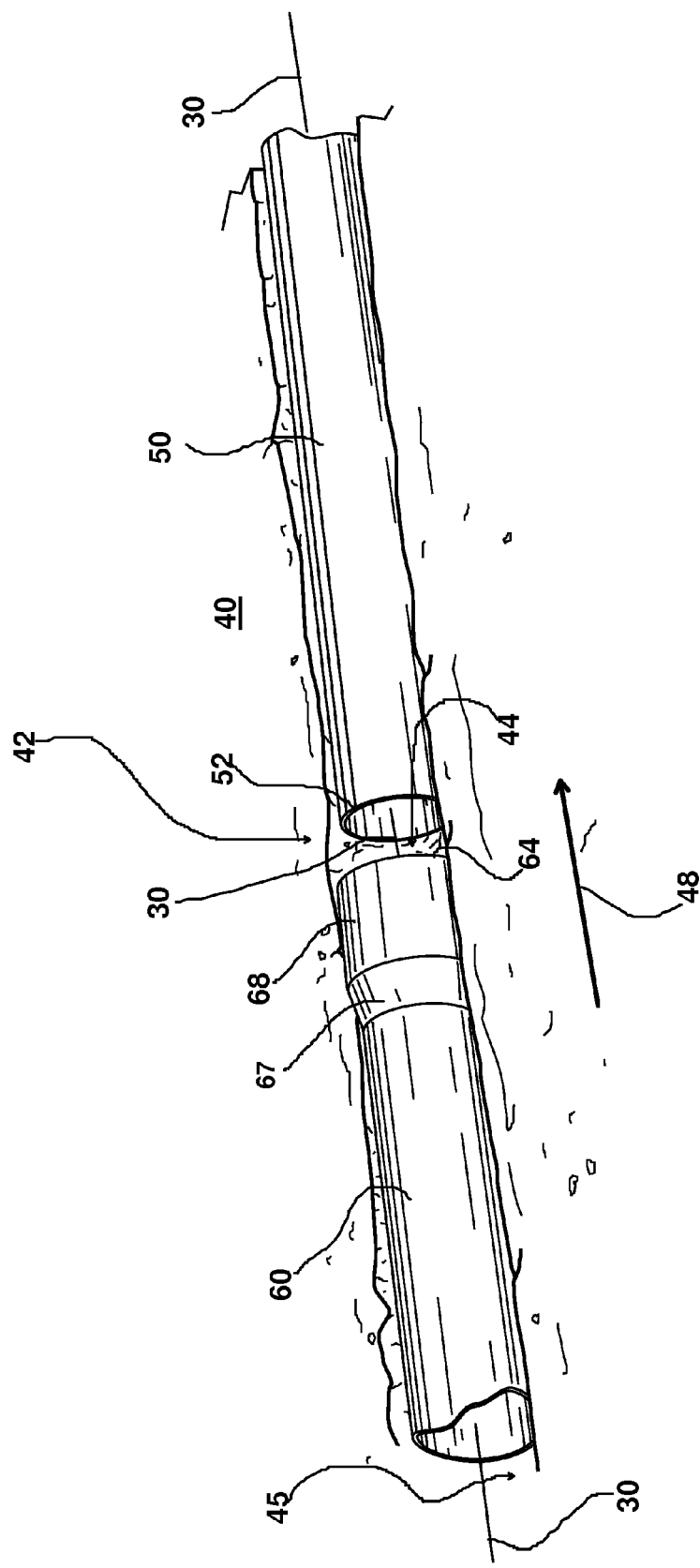
FIG. 4 is a side perspective view of first and second joints of pipe to be attached shown in FIG. 1, but now showing more clearly the ditch in which these joints rest before the pull.

FIG. 1 is a side view of first 50 and second 60 joints of pipe to be attached using the method and apparatus 10. Second joint 50 includes enlarged female end 68 at second end 64 within which will be pulled male end 52 of a first joint of pipe 50. In various embodiments the pulling can occur while first 50 and second 60 joints are primarily below grade 40 level, such as inside a ditch 42. FIG. 4 is a side perspective view of first 50 and second 60 joints of pipe to be attached, but now showing more clearly the ditch 42 in which these joints rest before the pull.

Figure 2:
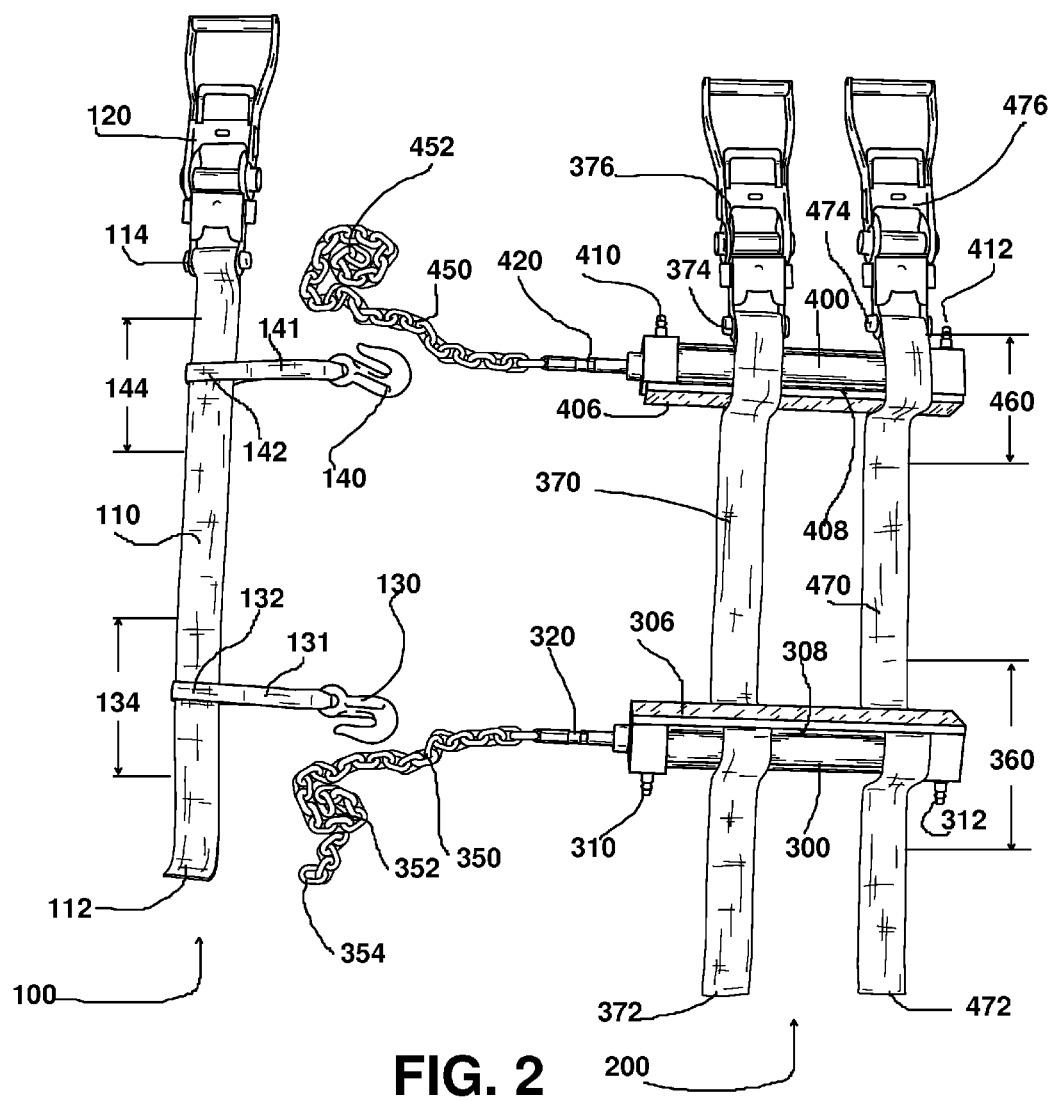
FIG. 2 is a top perspective view of the pulling and pulled section of the method and apparatus.
Figure 3:
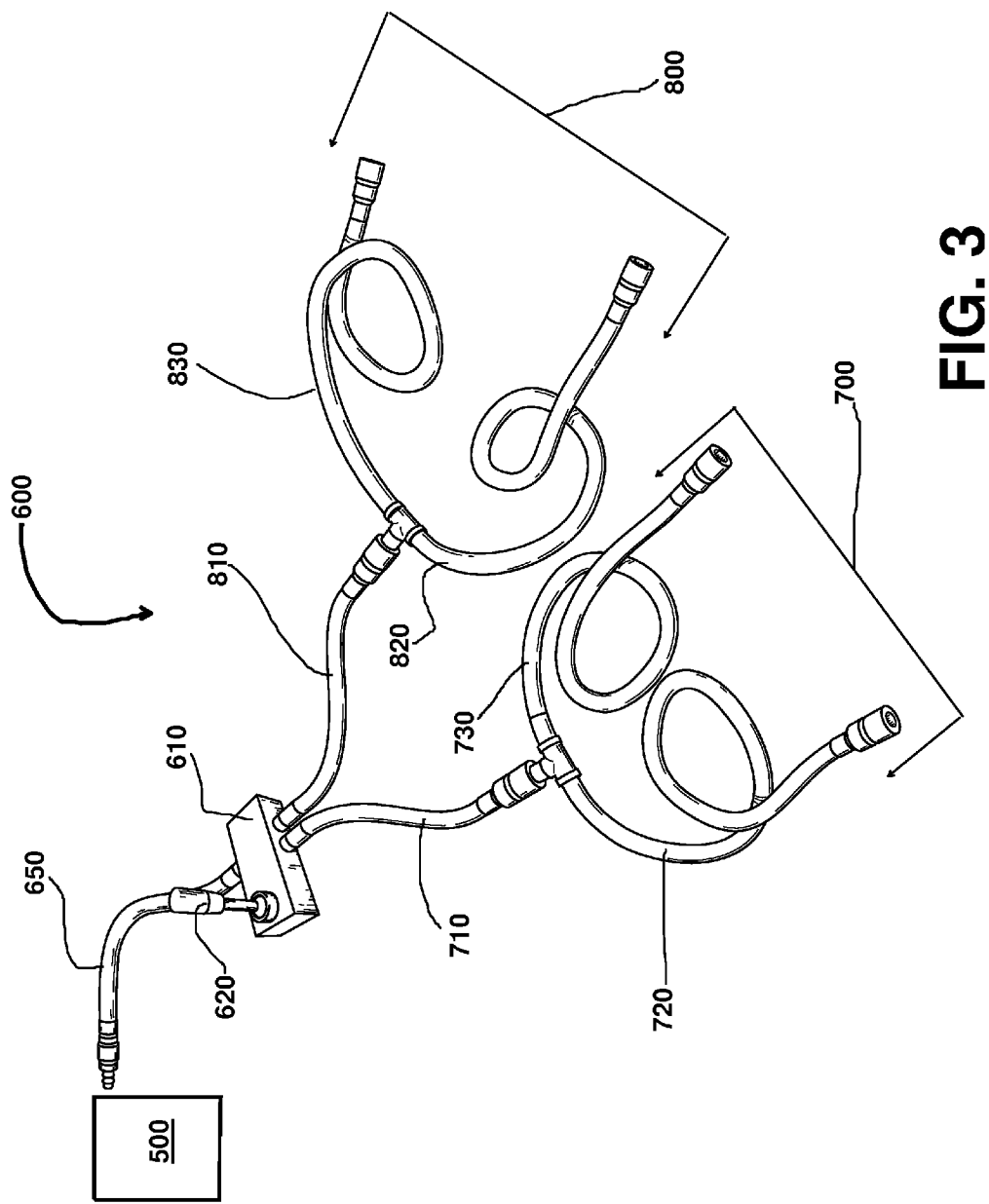
FIG. 3 is a perspective view of the control system for the pulling section.

FIG. 2 is a top perspective view of the pulling 200 and pulled 100 section of the method and apparatus 10. FIG. 3 is a perspective view of the control system 600 for the pulling section 200. In one embodiment, pulling apparatus 10 includes pulling section 200 and pulled section 100.

Pulled section 100 can include clamping belt 110 along with first 130 and second 140 laterally adjustable connectors. First connector 130 can include strap 131 and loop 132, and have an extent of lateral adjustability 134. Second connector 140 can include strap 141 and loop 142, and have an extent of lateral adjustability 144. Detachable connection can be achieved by the use of at least one clamping belt 110, with first end 112, second end 114, and sliding lock 120.

Pulling section 200 can include two pistons 300,400 which can be detachably connected to a pipe joint (e.g., joint 50). Detachable connection can be achieved by the use of at least one clamping belt 370, but preferably a second clamping belt 470 is also used.

First piston 300 can have rod 320 slidably connected to its piston chamber. First piston 300 can include inlets 310 and 312 for controlling extension and retraction of rod 320. Compressed gas entering inlet 310 causes retraction of rod 320 and compressed gas entering inlet 312 causes extension of rod 320. Rod 320 can be connected to pulling member 350 which can be a conventionally available chain or cable. First piston 300 can include a frictional increasing member 306, such as a rubber lining or like material.

Similar to first piston 300, second piston 400 can have rod 420 slidably connected to its piston chamber. Second piston 400 can include inlets 410 and 12 for controlling extension and retraction of rod 420. Compressed gas entering inlet 410 causes retraction of rod 420 and compressed gas entering inlet 412 causes extension of rod 420. Rod 420 can be connected to pulling member 450 which can be a conventionally available chain or cable. Second piston 400 can include a frictional increasing member 406, such as a rubber lining or like material.

First piston 300 can slidably connected to first clamping belt 370 through slot 308, and slidably connect to second clamping belt 470 through slot 308. First clamping belt 370 can include first end 372, second end 374, and sliding lock 376. Second piston 400 can slidably connected to first clamping belt 370 through slot 408, and slidably connect to second clamping belt 470 through slot 408. Second clamping belt 470 can include first end 472, second end 474, and sliding lock 476. First piston 300 can have an extent of lateral adjustability 360 relative to first 370 and second 470 belts. Second piston 400 can have an extent of lateral adjustability 460 relative to first 370 and second 470 belts.

FIG. 3 shows a perspective view of the control system 600 for apparatus 10. Control system 600 generally includes switching unit 610 and portable supply of compressed gas 500. Switching unit 610 can be controlled by handle 620. Supply of compressed gas 500 can be connected to switching unit 610 by inlet line 650. Switching unit 610 has two outlets which are connected to lines 710 and 810. Handle 620 controls three states: (a) state 1 where no gas is allowed to exist to either line 710 or line 810; (b) state 2 where gas is allowed to exit to line 710 but not line 810; and (c) state 3 where gas is allowed to exit to line 810 but not line 710. Line 710 is split into lines 720 and 730 (with lines 710, 720, and 730 generally being referred together as first set of lines 700). Line 810 is split into lines 820 and 830 (with lines 810, 820, and 830 generally being referred together as second set of lines 800).

Figure 5:
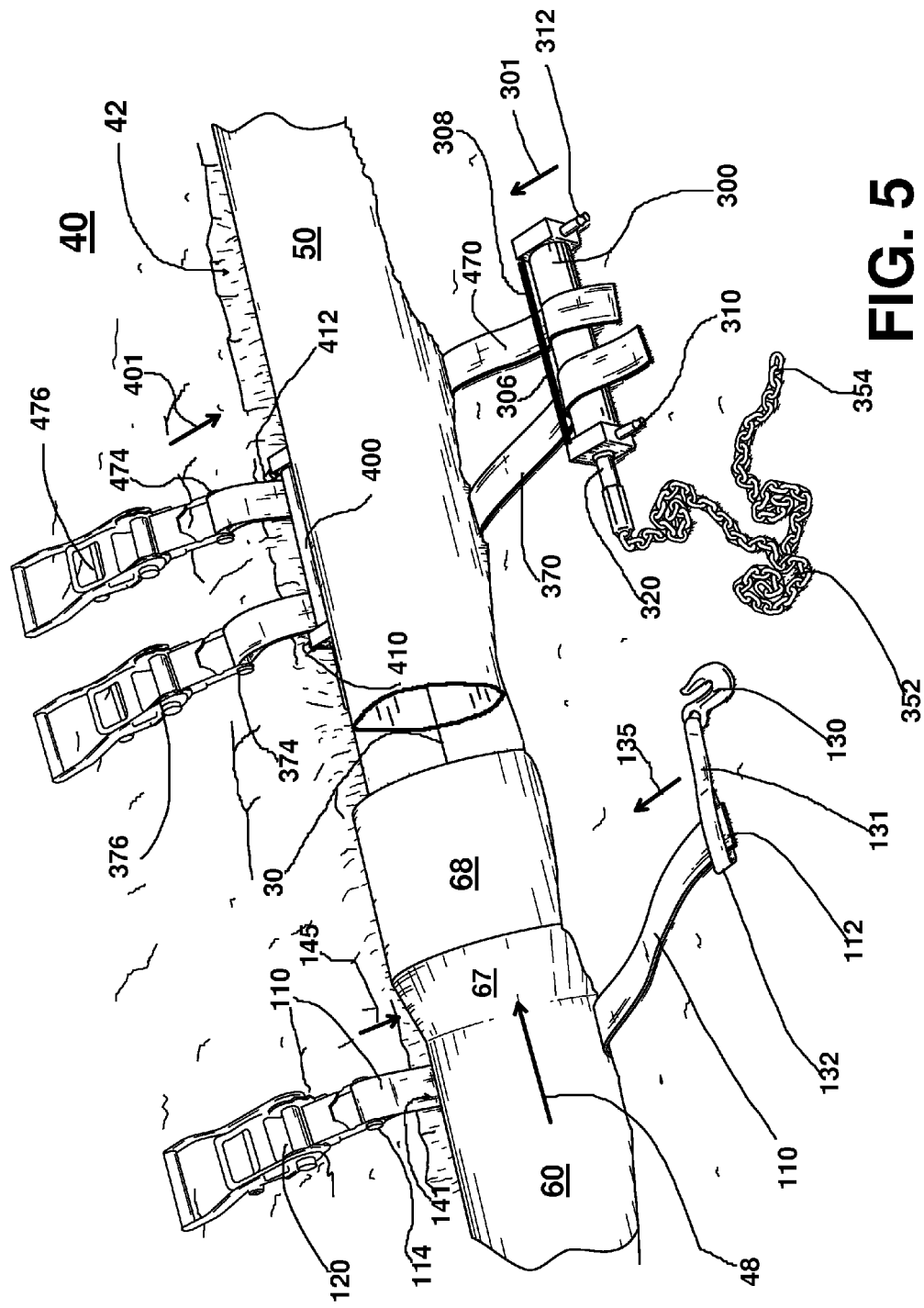
FIG. 5 is a is a perspective view of the apparatus on the pulled joints shown in FIG. 4 with the pulled section being installed around joints to be pulled.
Figure 6:
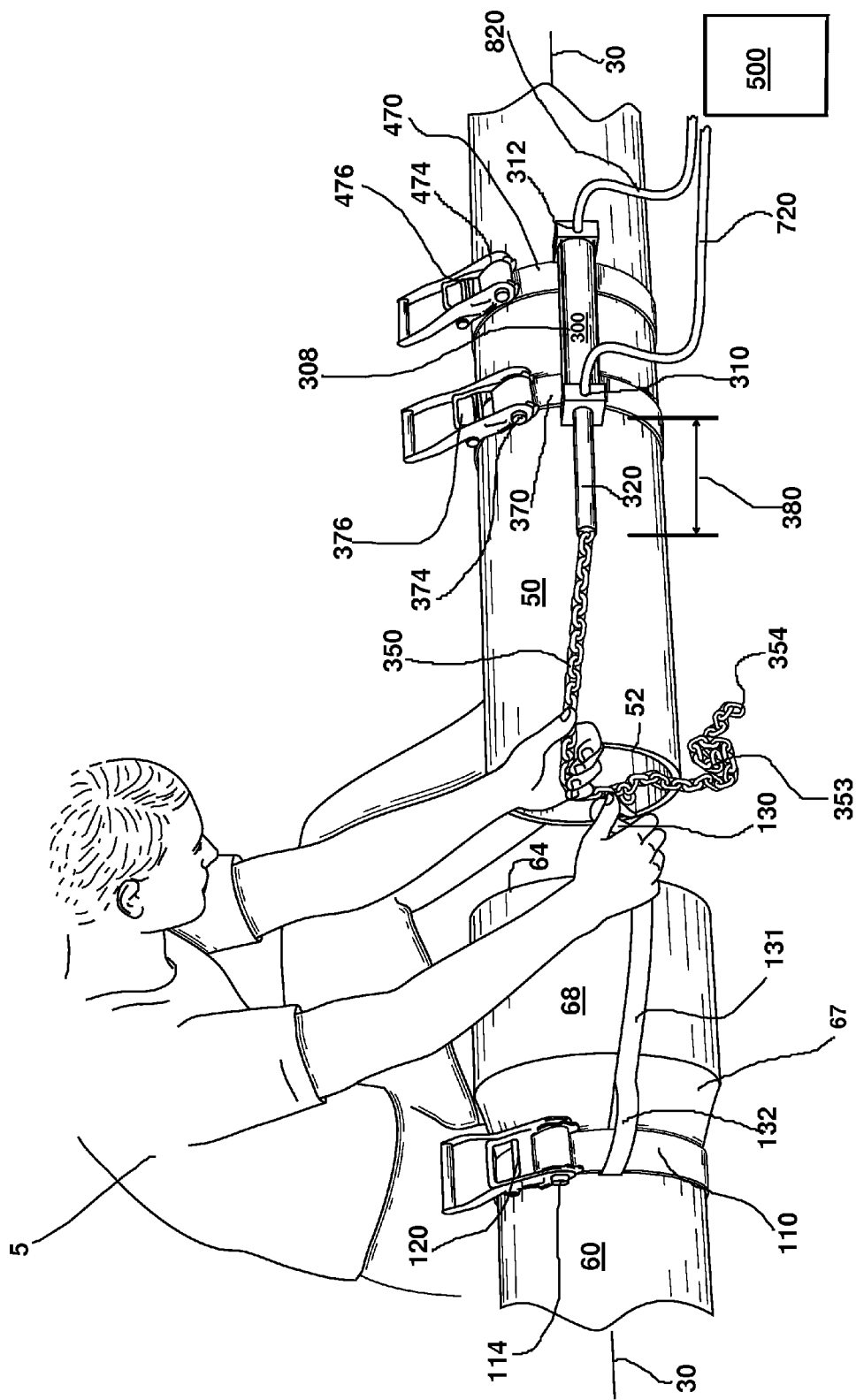
FIG. 6 is a perspective view of a user setting up the apparatus to make a pull.

FIGS. 5 and 6 are perspective views of apparatus 10 being connected to joints 50 and 60 with pulled section 100 being installed on joint 60 and pulling section being attached to joint 50. For purposes of clarity in FIG. 6 ditch 42 and ground 40 are not shown with all items being in empty space.

First 300 and second 400 cylinders can be positioned on the opposite sides of joint 50. Before joint 50 is placed in ditch 42 it is preferred that straps 370 and 470 be placed in ditch 42 under where joint 50 will be lowered. Also preferably before lowering of joint 50 into ditch 42, second cylinder 400 can be attached to straps 370 and 470 using slot 408. Alternatively, after joint 50 has been lowered into ditch 42 and on top of straps 370,470; second ends 374,474 of straps 370,470 can be threaded through slot 408 of second cylinder 400 and attaching sliding locks 376,476 so said second ends 374,474.

Positioning of Cylinders for Pulling Section

After joint 50 has been lowered into ditch 42 and on top of straps 370,470, cylinders 300,400 can be positioned about joint 50. Cylinder 300 can be slid over straps 370,470 (schematically indicated by arrow 301) to its ultimate pulling position when attached to joint 50. Cylinder 400 can be slid with respect to straps 370,470 (schematically indicated by arrow 401) to its ultimate pulling position when attached to joint 50. After cylinders 300 and 400 are positioned, sliding locks 376 and 476 can be used to lock in place cylinders 300 and 400.

Preferably, as indicated in FIG. 14A, cylinders 300,400 are symmetrically spaced about joint 50 to provide a balanced force on each side joints 50 and 60 which balanced force is parallel to central axis 30 to avoid any tendency to skew or cock joints 50 and 60 during a pull. However, as schematically indicted in FIG. 14A, both cylinders 300 and 400 have an extend of lateral adjustment, respectively angular ranges 360 and 460, such that cylinder 300 and/or 400 can be angularly spaced above or below the central axis 30.

In various embodiments both cylinder 300 and 400 are angularly spaced above central axis 30 although symmetrically spaced about joint 50.

In various embodiments both cylinder 300 and 400 are angularly spaced below central axis 30 although symmetrically spaced about joint 50.

In various embodiments both cylinder 300 is angularly spaced above central axis 30 while cylinder 400 is angularly spaced below central axis, although both cylinders 300 and 400 are symmetrically spaced about joint 50.

In various embodiments cylinder 300 can be non-symmetrically spaced about a joint compared to cylinder 400.

Positioning of Connectors for Pulled Section

After joint 60 has been lowered into ditch 42 and on top of strap 110, connectors 130 and 140 can be positioned about joint 60. Connector 130 can be slid over strap 110 (schematically indicated by arrow 135) to its ultimate position for being pulled when attached to joint 60. Connector 140 can be slid with respect to strap 110 (schematically indicated by arrow 145) to its ultimate position for being pulled when attached to joint 60. After connectors 130 and 140 are positioned, sliding lock 120 can be used to lock in place connectors 130 and 140.

Preferably, as indicated in FIG. 14C, connectors 130,140 are symmetrically spaced about joint 60 to provide a balanced pulled force on each side joints 50 and 60 which balanced force is parallel to central axis 30 to avoid any tendency to skew or cock joints 50 and 60 during a pull. However, as schematically indicted in FIG. 14C, both connectors 130 and 140 have an extent of lateral adjustment, respectively angular ranges 134 and 144, such that connector 130 and/or 140 can be angularly spaced above or below the central axis 30.

In various embodiments both connectors 130 and 140 are angularly spaced above central axis 30 although symmetrically spaced about joint 60.

In various embodiments both connectors 130 and 140 are angularly spaced below central axis 30 although symmetrically spaced about joint 60.

In various embodiments connector 130 is angularly spaced above central axis 30 while connector 140 is angularly spaced below central axis, although both connectors 130 and 140 are symmetrically spaced about joint 60.

In various embodiments connectors 130 and 140 can be non-symmetrically spaced about a joint.

Operatively Connecting Cylinders to Connectors

Preferably, when positioned on joints 50 and 60, cylinder 300 will line up with connector 130; and cylinder 400 will line up with connector 140 so that chains 350 and 450 will be substantially parallel with central axis 30 along with each other.

Over joint 50, chains 350 and 450 are respectively connected to rods 320 and 420. Over joint 60 chains 350 and 450 are respectively connected to connectors 130 and 140. Preferably, chains 350 and 450 will have some excess length (excess 353 and 453 respectively).

As shown in FIGS. 10-14, preferably, the length of chains 350 and 450 extend long enough to span the length of at least two normal sized joints 50,60 so that multiple pulls can be made without having to move pulling apparatus 200 from its attachment to joint 50.

Making a Pull for a First Set of Pipe Joints when Below Grade

Figure 7:
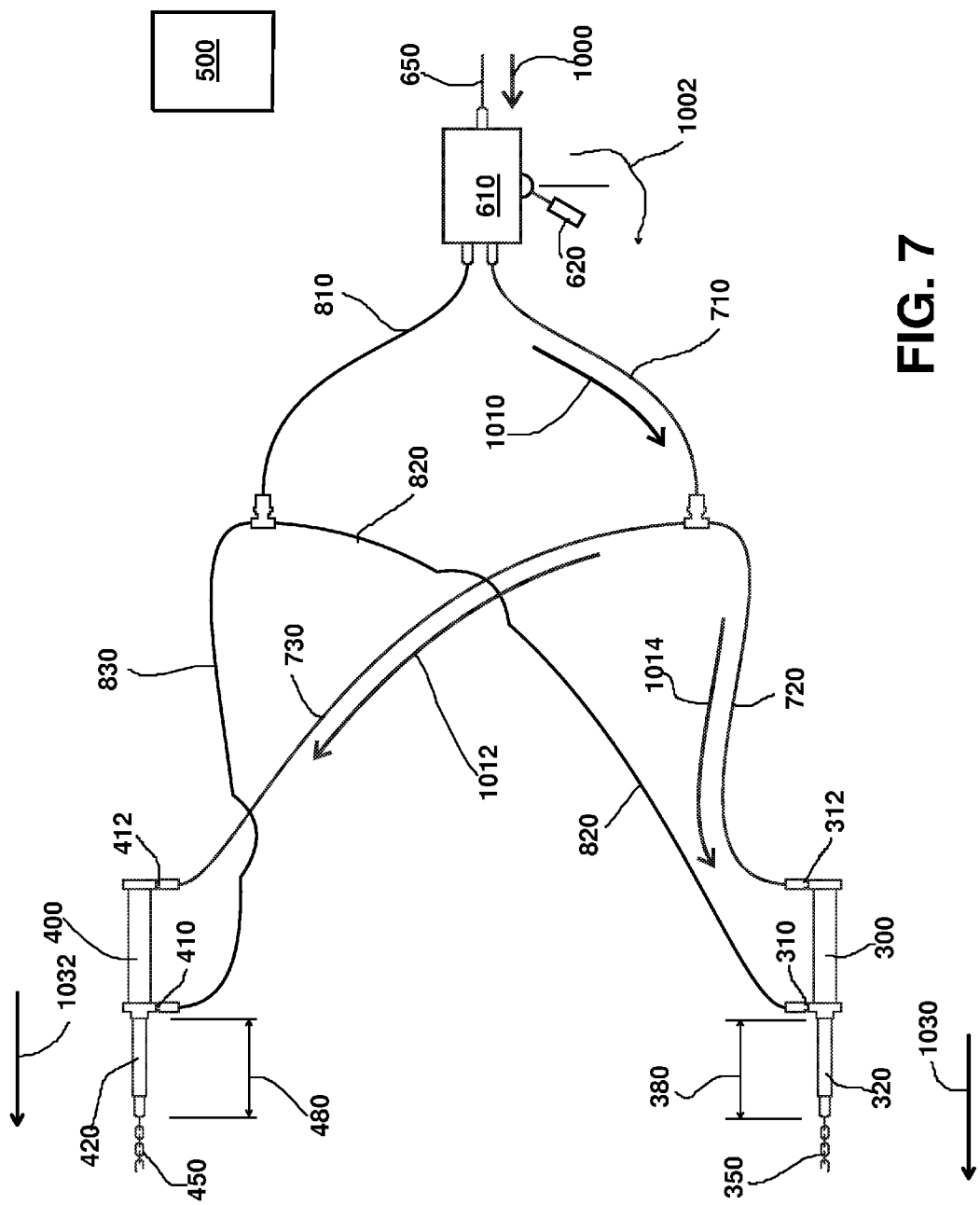
FIG. 7 is a schematic diagram of gas flow through the lines of the pulling section which will cause an extension of the pulling rods, and showing the rods in a fully extended condition.

Initially, rods 320 and 420 can be placed in the initial completely extended positions. FIG. 7 is a schematic diagram of gas flow through the lines 700 of the pulling section 200 which will cause an extension of the pulling rods 320,420, and showing the rods 320,420 in a fully extended condition (fully extended positions schematically indicated by dimensional lines 380,480). Handle 620 is moved (schematically indicated by arrow 1002) to allow flow from pressurized gas source 500 to flow lines 700. This flow proceeds through line 710 (schematically indicated by arrow 1010), flow being split into lines 720 (schematically indicated by arrow 1014) and 730 (schematically indicated by arrow 1012), and ultimately into ports 312 and 412 of cylinders 300 and 400. Flow into ports 312 and 412 respectively cause rods 320 and 420 to extend (schematically indicated by arrows 1030 and 1032). Cylinders 300 and 400 are now in a position to make a pull.

Figure 8:
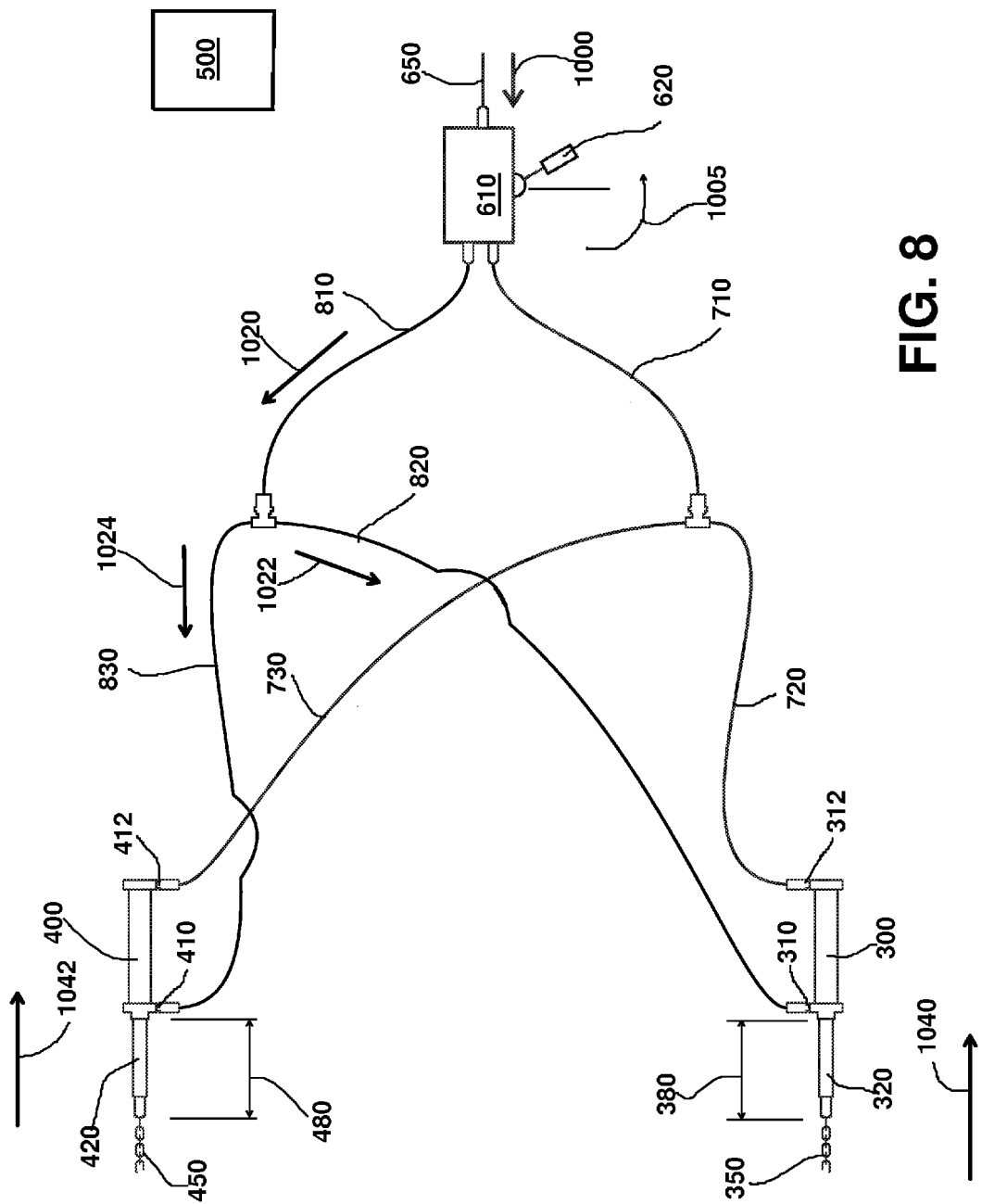
FIG. 8 is a schematic diagram of gas flow through the lines of the pulling section which will cause a retraction of the pulling rods, and at the beginning of a pull.
Figure 10:
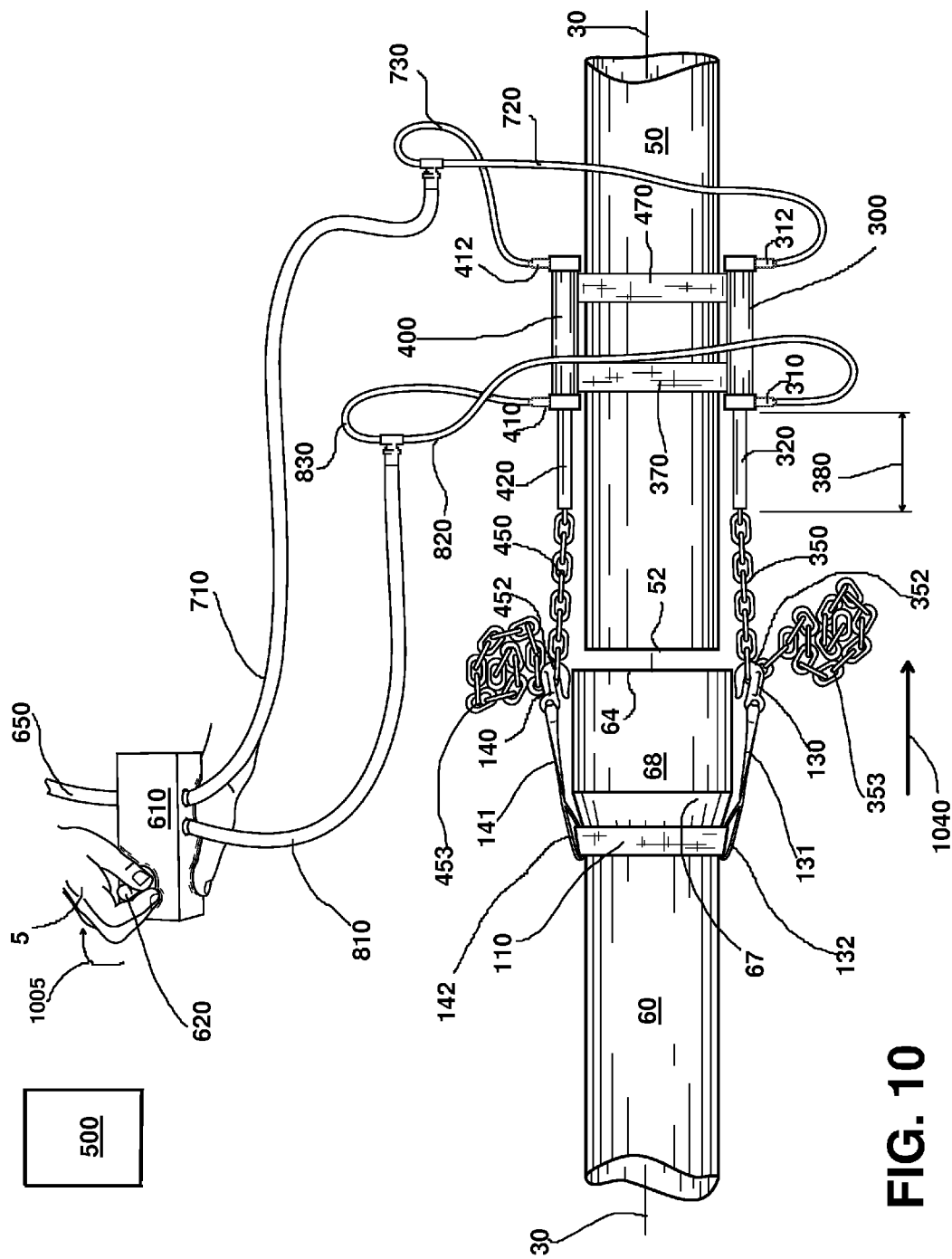
FIG. 10 is a perspective view of the apparatus now set up to make a pull between two joints of pipe.

FIG. 8 is a schematic diagram of gas flow through the line set 800 of the pulling section 200 causing retraction of the pulling rods 320,420 at the beginning of a pull. FIG. 10 is a perspective view of apparatus 10 now set up to make a pull between two joints of pipe 50 and 60. Handle 620 is moved (schematically indicated by arrow 1005) to flow from pressurized gas source 500 to flow lines 800. This flow proceeds through line 810 (schematically indicated by arrow 1020), flow being split into lines 820 (schematically indicated by arrow 1022) and 830 (schematically indicated by arrow 1024), and ultimately into ports 310 and 410 of cylinders 300 and 400. Flow into ports 310 and 410 respectively cause rods 320 and 420 to retract (schematically indicated by arrows 1040 and 1042). Cylinders 300 and 400 are now starting to make a pull respectively on chains 350 and 450 which are respectively connected to connectors 130 and 140 which are connected to joint 60.

Figure 9:
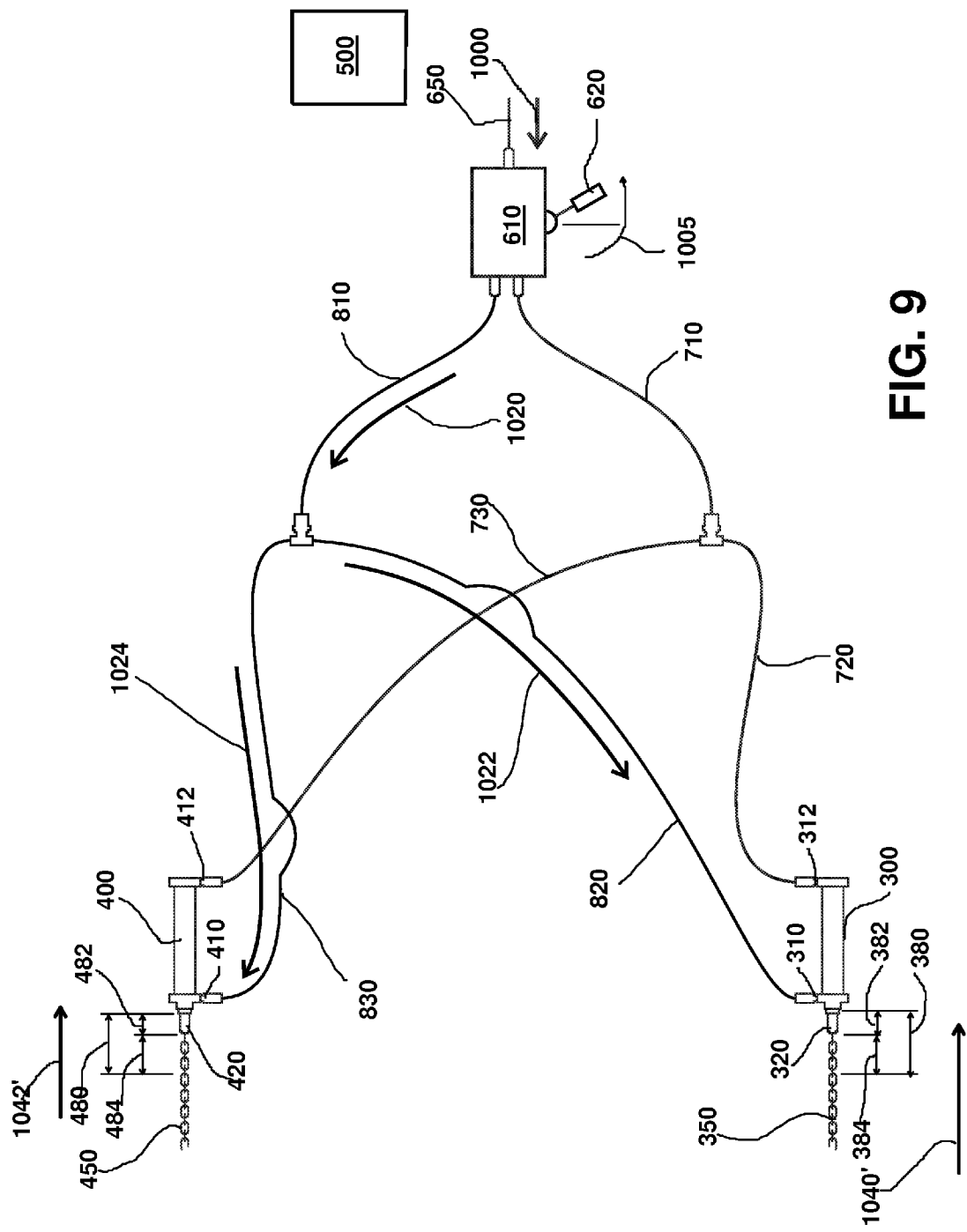
FIG. 9 is a schematic diagram of gas flow through the lines of the pulling section which will cause a retraction of the pulling rods, and at the end of a pull showing complete retraction.

FIG. 9 is a schematic diagram of gas flow through the line set 800 of the pulling section 200 causing continued retraction of the pulling rods 320,420, and in the middle of a pull.

Figure 11:
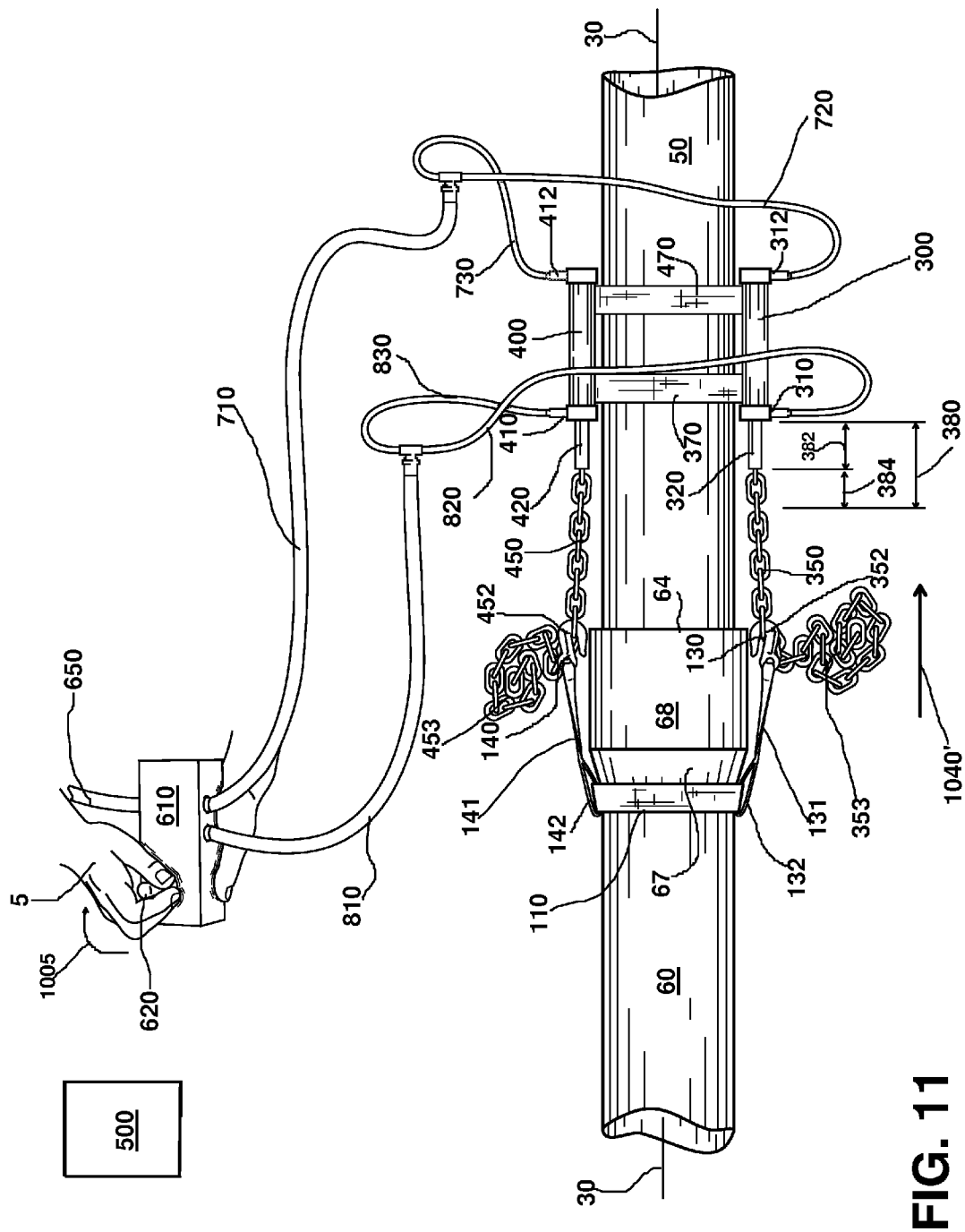
FIG. 11 is a perspective view of the apparatus in the middle of a a pull between two joints of pipe.

FIG. 11 is a perspective view of apparatus 10 in the middle of a pull between two joints of pipe 50 and 60. As shown in FIGS. 9 and 11, handle 620 is continued to be pushed in the direction of arrow 1005 allowing continued flow from source 500 to flow lines 800. This continued flow continues to proceed through line 810 (schematically indicated by arrow 1020), flow being split into lines 820 (schematically indicated by arrow 1022) and 830 (schematically indicated by arrow 1024), and ultimately into ports 310 and 410 of cylinders 300 and 400. Flow into ports 310 and 410 respectively continues to cause rods 320 and 420 to continue retract (schematically indicated by arrows 1040' and 1042'). Assuming that the chains 350,450 had little to no slack in the position indicated by FIG. 9, rods 320 and 420 have respectively pulled chains 350 and 450 an equal distance (schematically indicated by dimensional lines 384 and 484), which pulled distance has also moved joint 60 through connectors 130 and 140 being clamped onto belt 110. It is noted that shoulder 67 of joint 60 will restrict relative longitudinal movement of joint 60 and belt 110 (with attached connectors 130 and 140). As handle 620 is continued to be place in the position indicated by arrow 1005 continued flow in the directions of arrows indicated above will cause rods 320 and 420 to continue to retract in the directions of arrows 1040' and 1042 until either rods 320 and 420 bottom out in cylinders 300 and 400 or joints 50 and 60 full nest with each other.

In the situation of rods 320 and 420 bottoming out before joints 50 and 60 become fully nested a second, third, or more pulls can be made without relocated either pulling section 200 and pulled section 100. In this situation of bottoming out, handle 620 is moved in the direction of arrow 620 to fully extend rods 320 and 420 (as described with reference to FIG. 7). After full extension chains 350 and 450 are detached from connectors 130 and 140 and then reattached to connectors 130 and 140 to minimize any slack in chains 350 and 450. After reattaching chains 350 and 450, second, third, etc. pulls can be made using the procedure described above with respect to FIGS. 8 and 9 until additional retraction of rods 320 and 420 are prevented by the full nesting/attachment/connection of joints 50 and 60.

Figure 12:
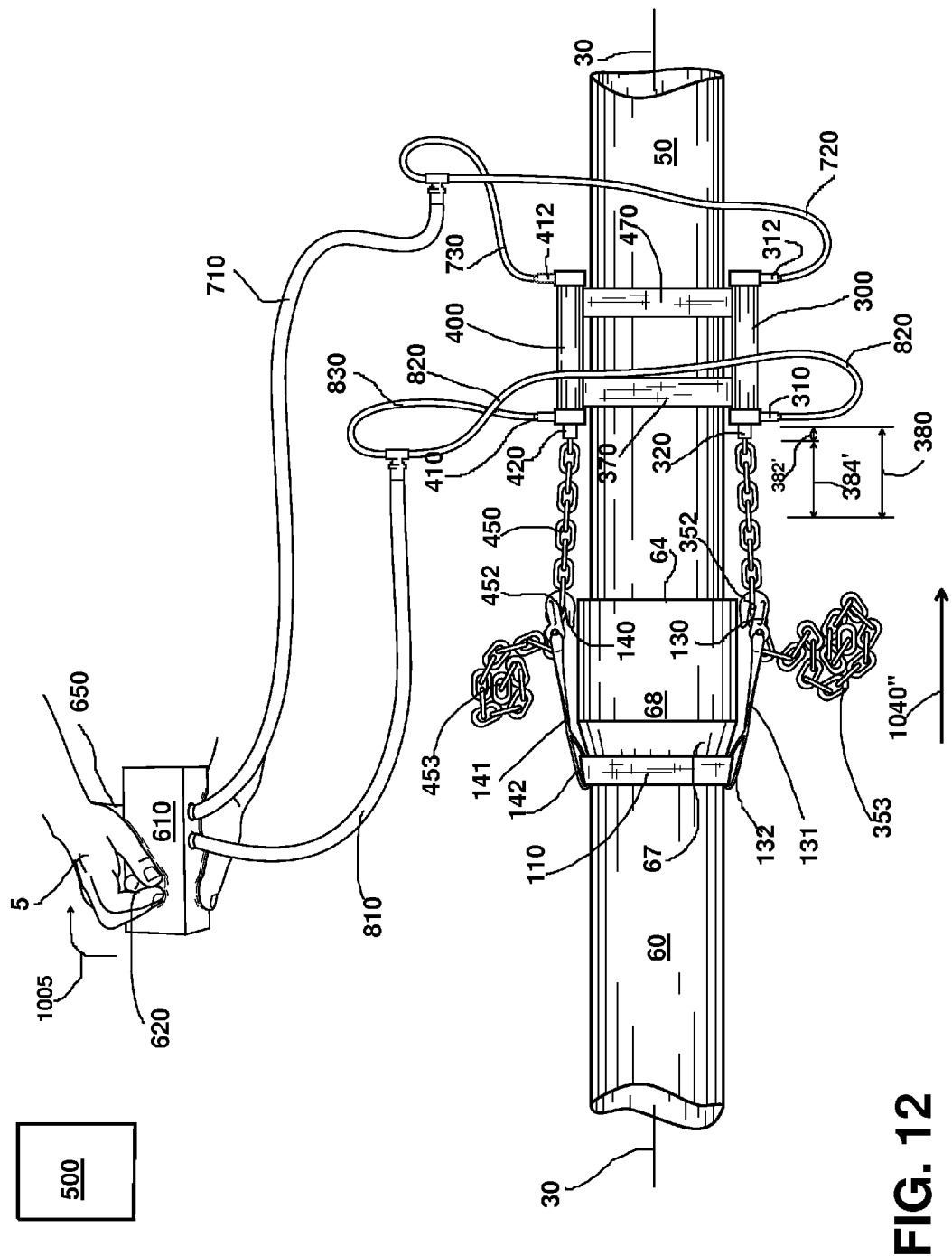
FIG. 12 is a perspective view of the apparatus finishing a pull between two joints of pipe.
Figure 13:
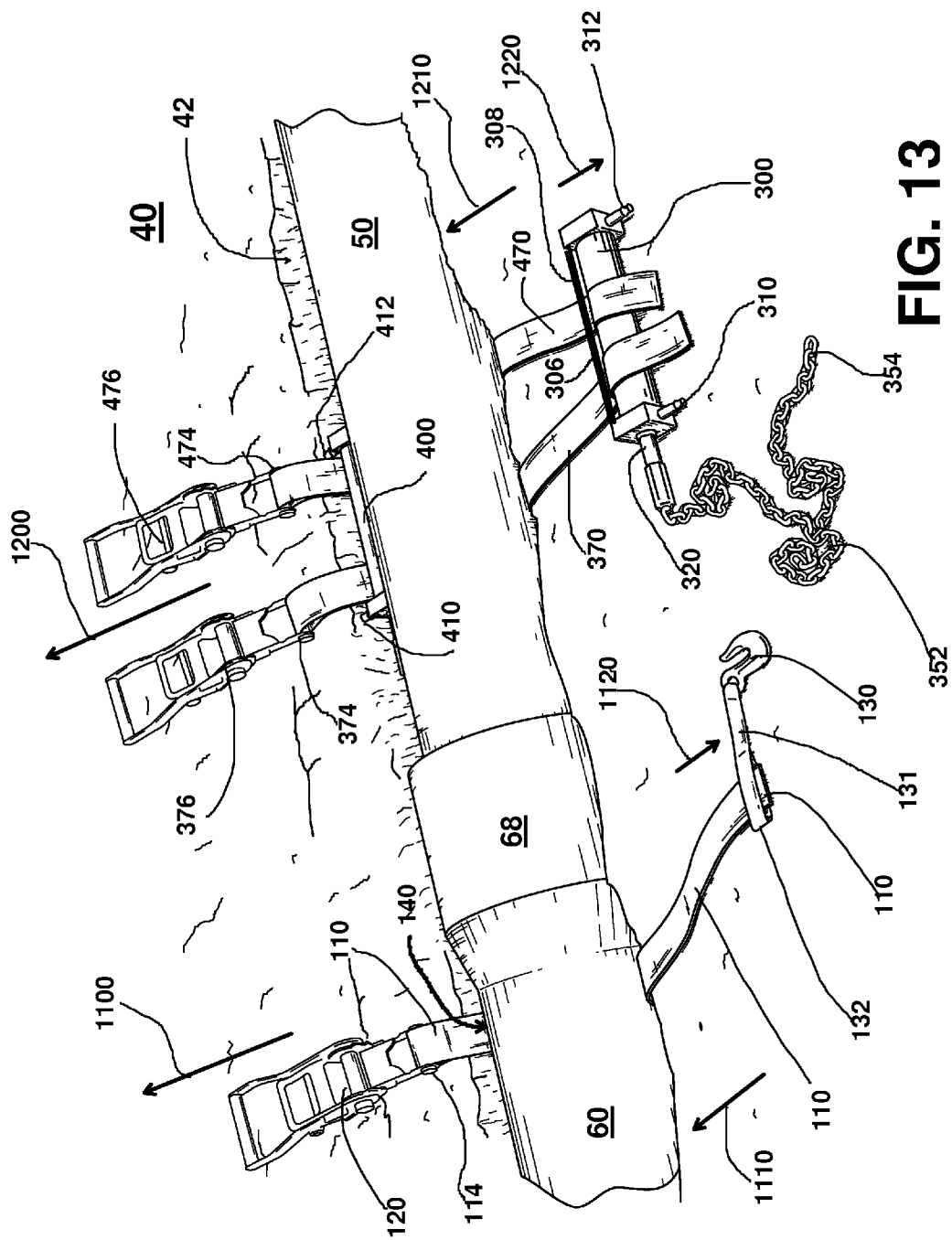
FIG. 13 is a is a perspective view of the apparatus on the pulled joints shown in FIG. 12 with the pulled section being removed from around the pulled joint so that it can be attached to a second joint of pipe to be pulled.

FIG. 12 is a perspective view of apparatus 10 finishing a pull between two joints of pipe 50 and 60. In FIG. 12, using the above described steps, joints 50 and 60 have full nested with each other wherein rods 320 and 420 have stopped retraction before bottoming out in cylinders 300 and 400. Dimensional line 384' schematically indicates the extent of retraction for the last pull to fully nest joints 50 and 60.

Figure 14:
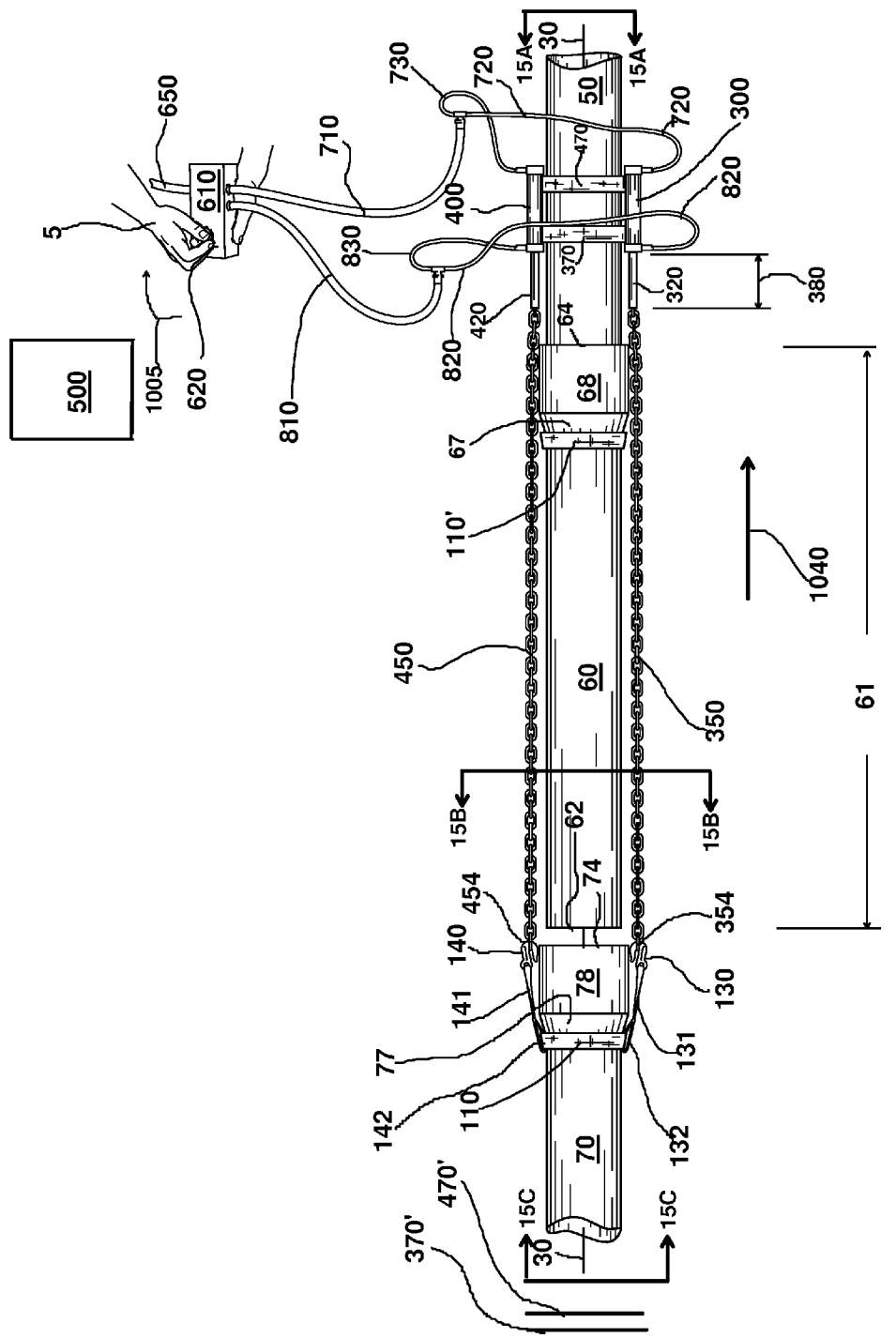
FIG. 14 is a perspective view of the apparatus now set up to make a second pull of a new joint of pipe onto the two joints of pipe connected in FIGS. 10 through 12.

Making a Pull for a Second Set of Pipe Joints without Relocating Pulling Section FIG. 14 is a perspective view of apparatus 10 now set up to make a second pull of a new joint of pipe 70 onto the two joints of pipe connected together with the pull(s) described regarding FIGS. 10 through 12.

Pulled section 100 is removed from joint 60, which removal is schematically shown in FIG. 14. FIG. 14 is a is a perspective view of apparatus 10 located on the pulled joints 50 and 60 with the pulled section 100 being removed from around the pulled joint 60 so that it 100 can be attached to a second joint of pipe 70 to be pulled. Sliding connector 120 is released and strap 110 removed from said connector. Belt 110 (with attached connector 140) can be removed from joint 60 by pulling in the direction of arrow 1100. Preferably, before pulling out belt 110, connector 130 is removed from belt 110 by sliding connector in the direction of arrow 1120. At this point pulled section can be laid in ditch 42 under the location of where new joint 70 will be placed in ditch 42 and then attached to said joint 70 in a similar manner as that described with respect to attaching pulled section to joint 60.

After attaching pulled section to joint 70, chains 350 and 450 can be attached to connectors 130 and 140 minimizing any slack in said chains. Because pulling section 200 has not been moved, chains 350 and 450 need to have an overall length which can span the length 61 of 60 to allow attachment to relocated connectors 130 and 140 (now relocated on joint 70). Now the pulling of joint 70 to nest with joint 60 follows a similar procedure as describe above with the pulling of joint 60 to nest with joint 50 and will not be described in detail again. However, it should be noted that pulling on joint 70 when the pulling section 200 is attached to joint 50 has the added advantage of ensuring that joint 60 completely nests with joint 50 because when joint 70 nests with joint 60, continued pulling forces on joint 70 will be transmitted through joint 60 causing it to want to further nest with joint 50.

Relocating Pulling Section to New Joint of Pipe

Chains 350 and 450 will not be long enough to make an infinite numbers of pulls without the need to relocate pulling section 200 from joint 50. Below is described a procedure for removing pulling section 200.

Pulling section 200 can be removed from joint 50, which removal is schematically shown in FIG. 14. FIG. 14 is a is a perspective view of apparatus 10 located on the pulled joints 50 and 60 with the pulling section 100 being removed from around joint 50 so that it 200 can be attached to another joint in the pipe line in connection with another set of pulls. Sliding connectors 376 and 476 are released and straps 370 and 470 removed from said connectors. Belts 370 and 470 (with attached cylinder 400) can be removed from joint 50 by pulling in the direction of arrow 1200. Preferably, before pulling out belts 370 and 470, cylinder 300 is removed from belts 370 and 470 by sliding cylinder in the direction of arrow 1220. At this point pulling section 200 can be laid in ditch 42 under the location of where new joint of pipe will be placed in ditch 42 and then attached to said joint of pipe in a similar manner as that described with respect to attaching pulling section to joint 50.

In one embodiment the end of an already pulled pipe (e.g., first end 72 of joint 70) must be slightly lifted in ditch 42 to allow placement of belts 370 and 470 under such joint 70 and attachment of pulling section 200 for the next set of joints of pipe to be pulled.

In one embodiment a second set of straps 370' and 470' can be laid in the ditch under the same joint of pipe (e.g., joint 70) on which the pulled section 100 is to be attached for a pull. This is schematically shown in FIG. 14. In this manner, belts 370' and 470' can be located under joint 70 for the next round of joint pulling.

Independent Adjustability of Pulling and Pulled Sections

Figure 15A:
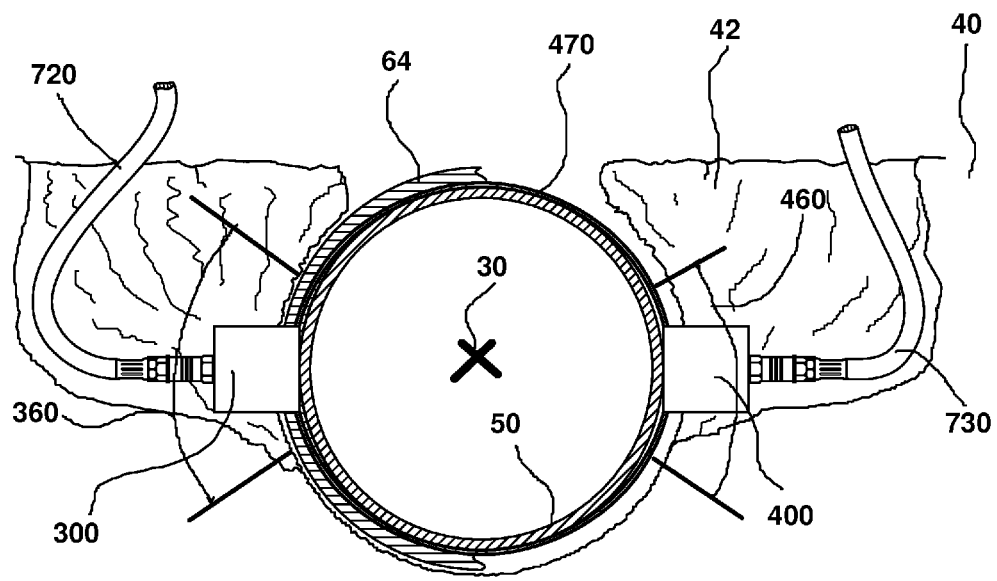
FIG. 15A is a sectional view of the system shown in FIG. 14 taken along the lines 15A—15A in FIG. 14.

FIG. 15A is a sectional view of the pulling apparatus 10 taken along the lines 15A—15A in FIG. 14. It is noted that pulling can be made at a time when the joints to be pulled are below grade 40 in ditch 42. Angular indicators 360 and 460 schematically indicate lateral adjustment of cylinders 300 and 400 relative to the joints in the set of joints.

Figure 15B:
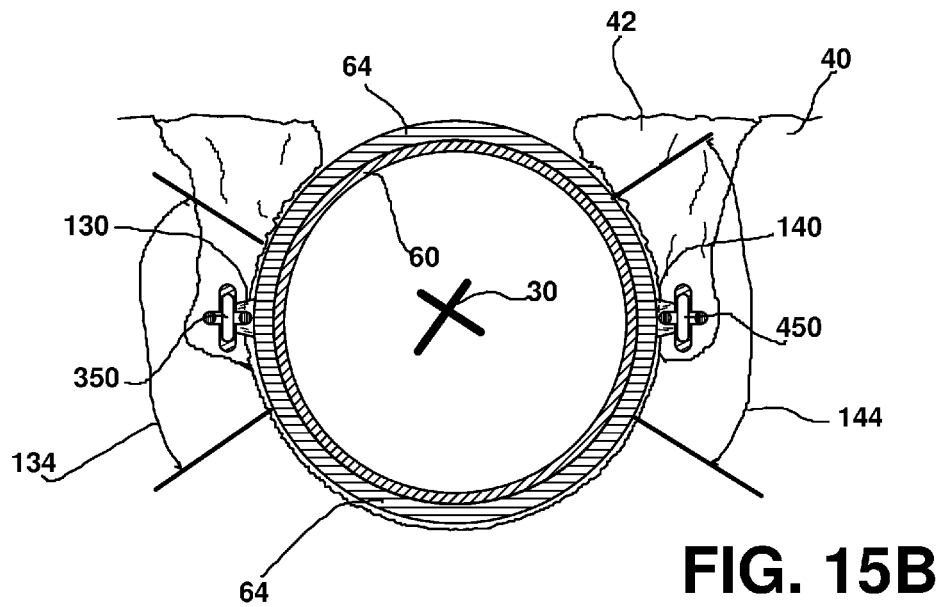
FIG. 15B is a sectional view of the system shown in FIG. 14 taken along the lines 15B—15B in FIG. 14.
Figure 15C:
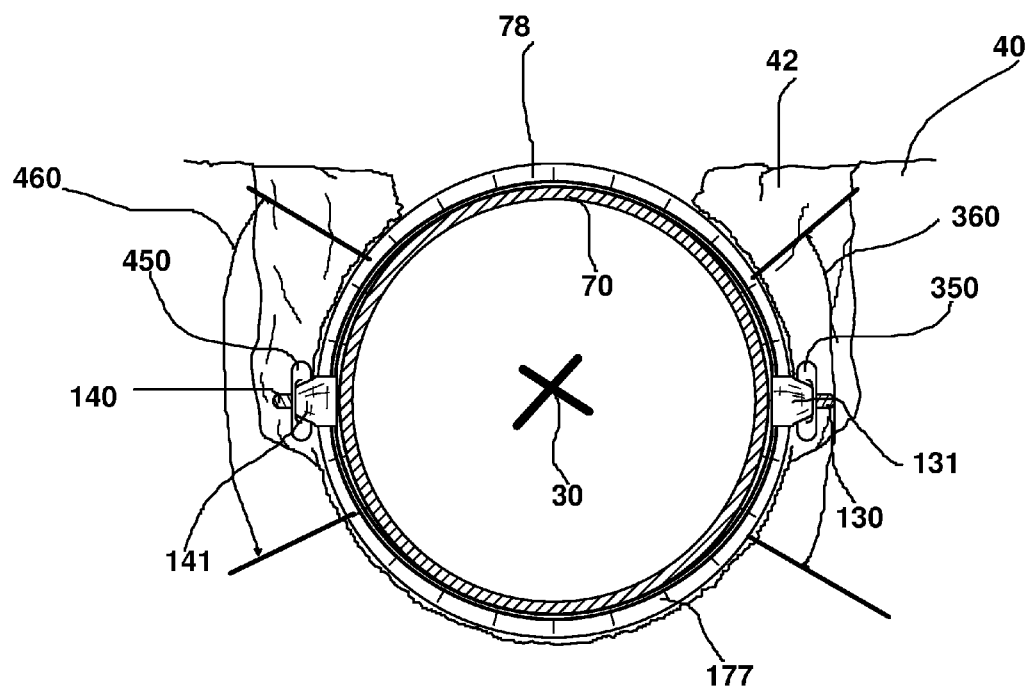
FIG. 15C is a sectional view of the system shown in FIG. 14 taken along the lines 15C—15C in FIG. 14.
Figure 15D:
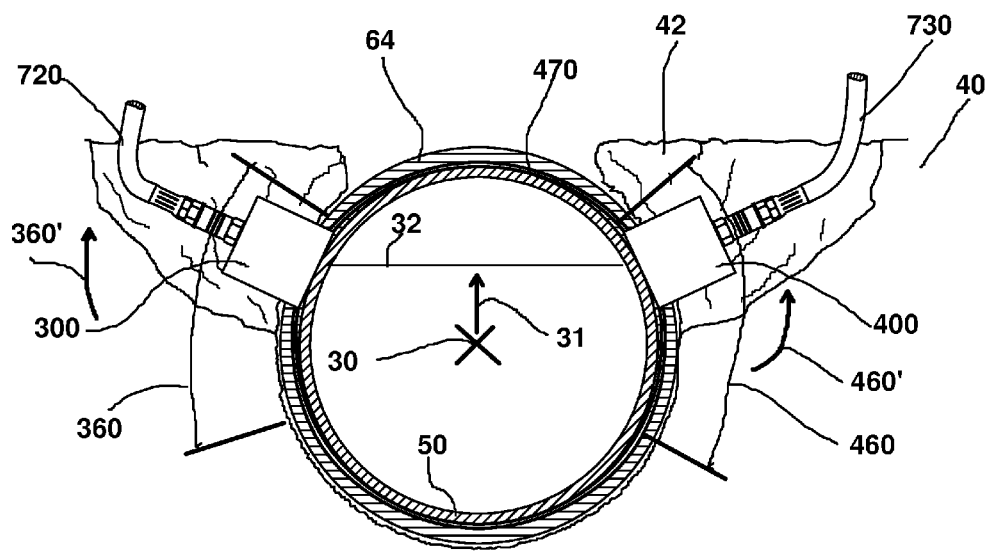
FIG. 15D is a sectional view of the system shown in FIG. 14 taken along the lines 15A—15A in FIG. 14, but showing first and second cylinders laterally adjusted with respect to the centerline of the joints of pipe.

FIG. 15D is a sectional view of the pulling apparatus 10 taken along the lines 15A—15A in FIG. 14, but now showing first 300 and second 400 cylinders laterally adjusted with respect to the centerline 30 of the joint 50. The lateral adjustment is schematically indicated by arrow 360' and 460'. With such lateral adjustment (arrows 360' and 460') first 300 and second 400 cylinders are located above the height of centerline 30 of joint 50.

Arrow 31 schematically indicates the raised position of first 300 and second 400 cylinders with respect to centerline 30—to line 32 which is show as being horizontal as first 300 and second 400 cylinders in this figure remain symmetrically spaced about centerline 30. In various embodiments line 32 spanning between first 300 and second cylinders will not be horizontal when first 300 and second 400 cylinders are not symmetrically spaced about centerline 30. For example arrow 360' may indicate that first cylinder 300 is laterally adjusted above centerline 30 by about 30 degrees while arrow 460' may indicate that second cylinder 400 is laterally adjusted above centerline by about 15 degrees. In various embodiments one of the cylinders can be laterally adjusted above centerline 30 while the other is laterally adjusted below centerline 30.

FIG. 15B is a sectional view of the pulling apparatus 10 taken along the lines 15B—15B in FIG. 14. Angular indicators 360 and 460 schematically indicate lateral adjustment of chains 350 and 450 relative to the joints in the set of joints.

Figure 16:
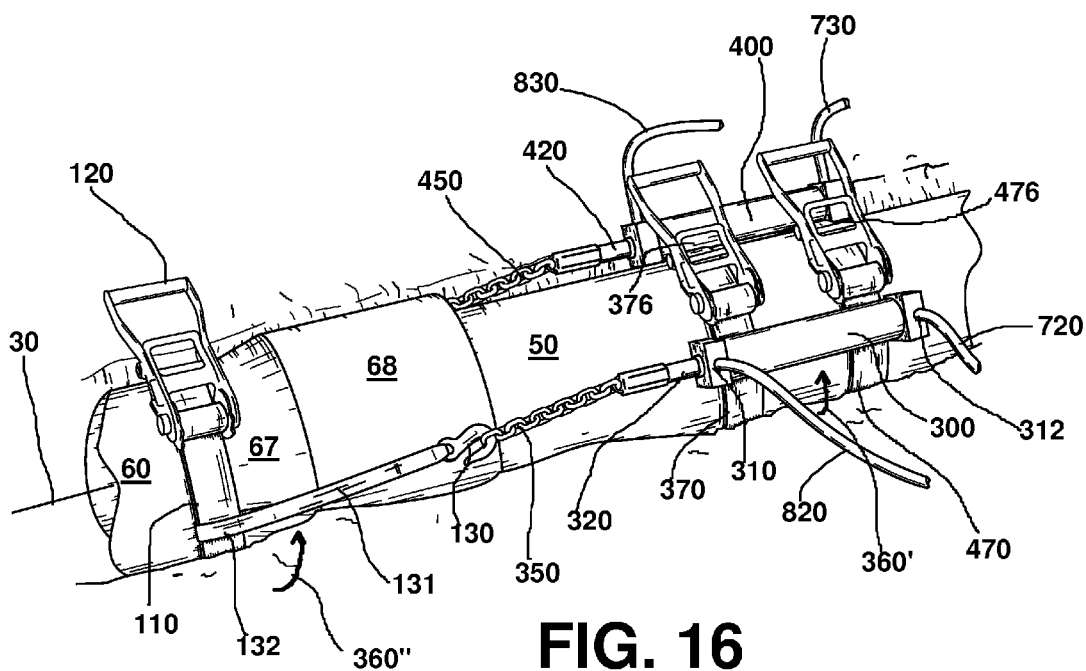
FIG. 16 is a perspective view of the system 10.

FIG. 15C is a sectional view of the pulling apparatus 10 taken along the lines 15C—15C in FIG. 14. Angular indicators 360 and 460 schematically indicate lateral adjustment of connectors 130 and 140 relative to the joints in the set of joints. FIG. 16 is a perspective view of pulling system 10 showing lateral adjustment of first 300 and second 400 cylinders along with lateral adjustment of first 130 and second 140 connectors.

In various embodiments connectors 130 and 140 can be laterally adjusted about centerline 30 to about the same extent as their respective first 300 and second 400 cylinders. In various embodiments the extent of lateral adjustment of one or both of first 130 and second 140 connectors can differ from the extent of lateral adjustment of one or both of first 300 and second 400 cylinders.

FIG. 16 is a perspective view of the system 10 shown in FIG. 15D and showing lateral adjustment (arrows 360' and 460') of first 300 and second 400 cylinders along with lateral adjustment (arrows 360" and 460") of first 130 and second 140 connectors.

In FIG. 16 it can be noted that belt 110 of pulled section 100 is held in place by shoulder 67 of joint 60. In this manner of connection of pulled section 100, friction is not as important as for pulling section 200 which depends on frictional resistance between the particular joint pulling section is connected to and pulling section members (e.g., first 300 and second 400 cylinders along with belts 370 and 470).

The following is a list of reference numerals:

| LIST FOR REFERENCE NUMERALS | |
| --- | --- |
| (Reference No.) | (Description) |
| 5 | user |
| 10 | attachment system |
| 30 | centerline |
| 31 | arrow |
| 32 | line between first and second cylinders |
| 40 | ground |
| 42 | ditch |
| 44 | interior |
| 45 | floor or bottom |
| 48 | arrow |
| 50 | pipe joint |
| 52 | first end |
| 54 | second end |
| 58 | enlarged female end |
| 60 | pipe joint |
| 61 | overall length of joint of pipe |
| 62 | first end |
| 64 | second end |

-continued

| LIST FOR REFERENCE NUMERALS | |
|---|---|
| (Reference No.) | (Description) |
| 67 | tapered shoulder |
| 68 | enlarged female end |
| 70 | pipe joint |
| 72 | first end |
| 74 | second end |
| 78 | enlarged female end |
| 100 | clamping section |
| 110 | clamping belt |
| 112 | first end |
| 114 | second end |
| 120 | sliding lock |
| 130 | first connector |
| 131 | strap for first connector |
| 132 | loop for first connector |
| 134 | extent of lateral adjustability of first connector relative to clamping belt |
| 135 | arrow |
| 140 | second connector |
| 141 | strap for second connector |
| 142 | loop for second connector |
| 144 | extent of lateral adjustability of second connector relative to clamping belt |
| 145 | arrow |
| 200 | powered section |
| 210 | first clamping belt |
| 212 | first end |
| 214 | second end |
| 218 | sliding lock |
| 230 | second clamping belt |
| 232 | first end |
| 234 | second end |
| 238 | sliding lock |
| 300 | first powered cylinder |
| 301 | arrow |
| 302 | first end |
| 304 | second end |
| 306 | frictional increasing base |
| 308 | adjustment slot |
| 310 | first inlet |
| 312 | second inlet |
| 320 | rod |
| 322 | first end |
| 350 | pull line |
| 352 | intermediate point of pull line |
| 353 | excess for pull line |
| 354 | end of pull line |
| 360 | extent of lateral adjustability of first cylinder relative to clamping belts |
| 370 | clamping belt |
| 372 | first end |
| 374 | second end |
| 376 | sliding lock |
| 380 | extended position of rod |
| 382 | amount of extension of rod |
| 384 | amount of retraction of rod |
| 385 | retracted position of rod |
| 400 | second powered cylinder |
| 401 | arrow |
| 402 | first end |
| 404 | second end |
| 406 | frictional increasing base |
| 408 | adjustment slot |
| 410 | first inlet |
| 412 | second inlet |
| 420 | rod |
| 422 | first end |
| 450 | pull line |
| 452 | intermediate point of pull line |
| 453 | excess for pull line |
| 454 | end of pull line |
| 460 | extent of lateral adjustability of second cylinder relative to clamping belts |
| 470 | clamping belt |
| 472 | first end |
| 474 | second end |

-continued

| LIST FOR REFERENCE NUMERALS | |
|---|---|
| (Reference No.) | (Description) |
| 476 | sliding lock |
| 480 | extended position of rod |
| 482 | amount of extension of rod |
| 484 | amount of retraction of rod |
| 485 | retracted position of rod |
| 500 | portable supply of compressed gas |
| 600 | portable compressed gas power unit |
| 610 | switching unit |
| 620 | handle |
| 650 | inlet line |
| 700 | first set of lines |
| 800 | second set of lines |
| 1000 | arrow |
| 1002 | arrow |
| 1005 | arrow |
| 1010 | arrow |
| 1012 | arrow |
| 1014 | arrow |
| 1020 | arrow |
| 1022 | arrow |
| 1024 | arrow |
| 1030 | arrow |
| 1030 | arrow |
| 1040 | arrow |
| 1042 | arrow |
| 1050 | arrow |
| 1060 | arrow |
| 1100 | arrow |
| 1110 | arrow |
| 1120 | arrow |
| 1130 | arrow |
| 1200 | arrow |
| 1210 | arrow |
| 1220 | arrow |
| 1230 | arrow |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of making up a string of pipe from a plurality of joints of pipe comprising the steps of:
   (a) providing a pipe joint pulling tool having:
      (i) a pulling section which is detachably connectable any selected one of the plurality of joints of pipe to be made up;
      (ii) a pulled section which is detachably connectable to any selected other of the plurality of joints to be made up;
   (b) attaching the pulling section to a first joint from the plurality of joints of pipe and attaching the pulled section to a second joint from the plurality of joints of pipe, wherein the pulling section is spaced apart from the pulled section and the pulling section and pulled section are operatively connected together;

(c) after step "b" while the pulling section is attached to the first joint, the pulling section pulling on the pulled section and causing the first and second joints of pipe to be made up by the pulling closer the spaced apart pulling and pulled sections;

(d) wherein, after step "c" the pulled section is detached from the second joint of pipe and detachably connected to a third joint of pipe from the plurality of joints of pipe, and while the pulling section is attached to the first joint, pulling on the pulled section and causing the third and second joints of pipe to be made up by the pulling closer the spaced apart pulling and pulled sections.

2. The method of claim 1, further comprising the additional step of after step "d", the pulled section being detached from the last made up joint of pipe the pulled section detachably connected to and then detachably connecting the pulled section to a newly selected joint of pipe from the plurality of joints of pipe, and while the pulling section is attached to the first joint, pulling on the pulled section and causing the newly selected joint of pipe and last made up joint to be made up by the pulling closer the spaced apart pulling and pulled sections.

3. The method of claim 1, wherein in step "a" the pulling section comprises first and second powered cylinders with retractable and extendable rods, and the first and second cylinders are symmetrically spaced about the first joint.

4. The method of claim 3, wherein the first joint has a longitudinal centerline and the first and second powered cylinders are at a level higher than the longitudinal centerline.

5. The method of claim 3, wherein the first and second powered cylinders are each laterally adjustable relative to each other about the first joint.

6. The method of claim 3, wherein the pulling section includes at least one clamping belt, the first and second cylinders are slidably connected to the at least one clamping belt, and the at least one clamping belt is detachably connected to the first joint.

7. The method of claim 6, wherein before step "b" the at least one clamping belt of the pulling section was placed under the first joint before the first joint was placed below grade.

8. The method of claim 6, wherein before step "b" the at least one clamping belt of the pulling section was placed in a ditch, and then the first joint was also placed in the ditch on top of the at least one clamping belt for the pulling section, and wherein the pulled section includes at least one clamping belt, the first and second connectors being slidably connected to the at least one clamping belt for the pulled section, and before step "b" the at least one clamping belt for the pulled section was placed in the ditch, and then the second joint placed in the ditch on top of the at least one clamping belt for the pulling section.

9. The method of claim 8, wherein during step "d" the at least one clamping belt for the pulled section is pulled out of the ditch from around the second joint before step "b" the at least one clamping belt for the pulled section was placed in the ditch, and the at least one clamping belt for the pulled section is again placed in the ditch and the third joint of pipe placed in the ditch on top of the at least one clamping belt for the pulling section.

10. The method of claim 6, wherein the slidable connection between the first and second cylinders and the at least one clamping belt having a first clamping length provides lateral adjustability of the pipe joint pulling tool, and the lateral adjustability is used to attach joints of multiple different diameters of piping with the pipe joint pulling tool by adjusting the length of the at least one clamping belt from the first clamping length to a second clamping length, which second clamping length is not equal to the first clamping length, and by sliding the first and second cylinders relative to the at least one clamping belt.

11. The method of claim 1, wherein in step "a" the pulling section comprises first and second powered cylinders with retractable and extendable rods, and the first and second cylinders are non-symmetrically spaced about the first joint.

12. The method of claim 11, wherein in step "a" the pulled section comprises first and second connectors that are non-symmetrically spaced about the first joint, but which line up with the first and second powered cylinders.

13. The method of claim 1, wherein the first, second, and third joints at each at least 10 feet in length.

14. The method of claim 1, the made up string is pipe is to be buried below a grade, and wherein during step "b", and first and second joints of pipe are located below the grade.

15. The method of claim 14, wherein during step "d", the third joint of pipe is located below the grade.

16. The method of claim 1, wherein in step "a" the pulling section has a portable supply of compressed gas which is operatively connected to the first and second powered cylinders.

17. The method of claim 16, wherein the supply of compressed gas is selected from the group consisting of compressed air and compressed carbon dioxide.

18. The method of claim 1, wherein in step "a" the portable supply of compressed gas is contained in a portable tank.

19. A method of making up a string of pipe from a plurality of joints of pipe comprising the steps of:
(a) providing a pipe joint pulling tool having:
  (i) a pulling section including first and second gas powered cylinders which are independently laterally adjustable, and which are is detachably connectable to any selected one of the plurality of joints of pipe to be made up using at least one clamping belt, the first and second gas powered cylinders being powered by a portable supply of compressed gas;
  (ii) a pulled section including first and second connectors which are independently laterally adjustable, and which are is detachably connectable to any selected other of the plurality of joints to be made up using at least one clamping belt;
(b) attaching the pulling section to a first joint from the plurality of joints of pipe and attaching the pulled section to a second joint from the plurality of joints of pipe, wherein the pulling section is spaced apart from the pulled section and the pulling section and pulled section are operatively connected together;
(c) after step "b" while the pulling section is attached to the first joint, the pulling section pulling on the pulled section and causing the first and second joints of pipe to be made up by the pulling closer the spaced apart pulling and pulled sections;
(d) wherein, after step "c" the pulled section is detached from the second joint of pipe and detachably connected to a third joint of pipe from the plurality of joints of pipe, and while the pulling section is attached to the first joint, pulling on the pulled section and causing the third and second joints of pipe to be made up by the pulling closer the spaced apart pulling and pulled sections.

20. An apparatus for making up a string of pipe from a plurality of joints of pipe comprising pipe joint pulling tool having:
(a) a pulling section including first and second gas powered cylinders which are independently laterally adjustable, and which are is detachably connectable to any selected one of the plurality of joints of pipe to be made up using at least one clamping belt, the first and second gas powered cylinders being powered by a portable supply of compressed gas;

(b) a pulled section including first and second connectors which are independently laterally adjustable, and which are is detachably connectable to any selected other of the plurality of joints to be made up using at least one clamping belt.

\* \* \* \* \*